US011330313B2

(12) United States Patent
Bikumala (10) Patent No.: US 11,330,313 B2
(45) Date of Patent: May 10, 2022

(54) CROWD RATING MEDIA CONTENT BASED ON MICRO-EXPRESSIONS OF VIEWERS

(71) Applicant: Dell Products L. P., Round Rock, TX (US)

(72) Inventor: Sathish Kumar Bikumala, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/530,196

(22) Filed: Aug. 2, 2019

(65) Prior Publication Data
US 2021/0037271 A1 Feb. 4, 2021

(51) Int. Cl.
*H04N 21/238* (2011.01)
*H04N 21/2387* (2011.01)
*G06K 9/00* (2022.01)
*H04N 21/4223* (2011.01)
*H04N 21/845* (2011.01)

(52) U.S. Cl.
CPC ..... *H04N 21/2387* (2013.01); *G06K 9/00302* (2013.01); *H04N 21/4223* (2013.01); *H04N 21/8456* (2013.01)

(58) Field of Classification Search
CPC ......... H04N 21/44218; H04N 21/2387; H04N 21/4223; H04N 21/8456; G06K 9/00302
See application file for complete search history.

(56) References Cited

U.S. PATENT DOCUMENTS

| 2004/0199923 | A1* | 10/2004 | Russek | G06F 16/285 719/310 |
| 2009/0006288 | A1* | 1/2009 | Yamamoto | G11B 27/105 706/12 |
| 2009/0317060 | A1* | 12/2009 | Han | H04N 9/8205 386/248 |
| 2010/0251295 | A1* | 9/2010 | Amento | H04N 21/475 725/38 |
| 2011/0098056 | A1* | 4/2011 | Rhoads | G09G 5/00 455/456.1 |
| 2011/0243530 | A1* | 10/2011 | Kashima | H04N 21/8456 386/248 |
| 2012/0066705 | A1* | 3/2012 | Harada | H04N 21/4662 725/12 |

(Continued)

*Primary Examiner* — Jefferey F Harold
*Assistant Examiner* — Timothy R Newlin
(74) *Attorney, Agent, or Firm* — Krishnendu Gupta; Deepika Bhayana; Dorothy Wu Chiang (57) ABSTRACT

In some examples, a computing device initiates playback of media content on a display device. The computing device receives one or more images from a camera having a field of view that includes one or more viewers of the display device. The computing device may analyze at least one of the images and determine, based on the analysis, a micro-expression being expressed by at least one of the viewers. The computing device may determine a sentiment based on the micro-expression. A timestamp derived from the one or more images may be associated with the sentiment and sent to a server to create a sentiment map of the media content. If the sentiment matches a pre-specified sentiment then the computing device may skip playback of a remainder of a current portion of the media content that is being displayed and initiate playback of a next portion of the media content.

18 Claims, 4 Drawing Sheets

(56) References Cited

U.S. PATENT DOCUMENTS

| | | | | |
|---|---|---|---|---|
| 2014/0007147 A1* | 1/2014 | Anderson | H04N 21/2665 | 725/9 |
| 2014/0098986 A1* | 4/2014 | Harrington | G11B 27/28 | 382/100 |
| 2014/0108309 A1* | 4/2014 | Frank | G07C 13/00 | 706/12 |
| 2014/0195919 A1* | 7/2014 | Wieder | H04L 67/306 | 715/730 |
| 2014/0282721 A1* | 9/2014 | Kuncl | G06Q 30/02 | 725/35 |
| 2014/0359647 A1* | 12/2014 | Shoemake | H04N 21/25891 | 725/10 |
| 2015/0026708 A1* | 1/2015 | Ahmed | G06F 3/011 | 725/12 |
| 2015/0070516 A1* | 3/2015 | Shoemake | H04N 21/4755 | 348/207.11 |
| 2015/0281595 A1* | 10/2015 | Zimmermann | H04N 5/265 | 348/660 |
| 2016/0029057 A1* | 1/2016 | Wickenkamp | H04N 21/252 | 725/14 |
| 2016/0066036 A1* | 3/2016 | Felt | H04N 21/4542 | 386/241 |
| 2016/0366203 A1* | 12/2016 | Blong | H04L 51/32 | |
| 2017/0257410 A1* | 9/2017 | Gattis | H04N 21/8455 | |
| 2018/0253222 A1* | 9/2018 | Zhao | G06F 3/04847 | |
| 2020/0092610 A1* | 3/2020 | Baughman | H04N 21/4415 | |

\* cited by examiner

CROWD RATING MEDIA CONTENT BASED ON MICRO-EXPRESSIONS OF VIEWERS

BACKGROUND OF THE INVENTION

Field of the Invention

This invention relates generally to determining a user's micro-expression when media content is being played back on a display device (e.g., television) and, more particularly to sending the captured micro-expressions to a server to a create a crowd-based sentiment map of the media content.

Description of the Related Art

As the value and use of information continues to increase, individuals and businesses seek additional ways to process and store information. One option available to users is information handling systems (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Content ratings are usually associated with an entire media content item (e.g., a movie, a show, or the like). A media content may include any audio, video media content or both. For example, the media content may include audio-playbacks, music, songs, news, podcasts, shows such as comedy shows, or three-dimensional media content. For example, a media content item may be rated "R" (restricted) because of one or two particular scenes. Adults viewing "R" rated media content may not want a child who walks into the room to view the particular scenes but may be okay with the child temporarily viewing other portions of the media content.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device initiates playback of media content on a display device. The computing device receives one or more images from a camera having a field of view that includes one or more viewers of the display device. The computing device may analyze at least one of the images and determine, based on the analysis, a micro-expression being expressed by at least one of the viewers. The computing device may determine a sentiment based on the micro-expression. A timestamp derived from the one or more images may be associated with the sentiment and sent to a server to create a sentiment map of the media content. If the sentiment matches a pre-specified sentiment, then the computing device may skip playback of a remainder of a current portion of the media content that is being displayed and initiate playback of a next portion of the media content.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein may monitor a user's facial expressions (e.g., micro-expressions) when viewing media content being displayed on a display device (e.g., a television). The media content may be sent to the display device by a computing device (e.g., IHS), such as, for example, a set-top box or other media streaming device (e.g., Amazon® fire stick, Roku® media box, or the like). The systems and techniques may capture the user's facial expressions in a set of images (e.g., one or more video frames) and timestamp each set of images. A machine learning module may analyze the set of images to identify a micro-expression and to determine a sentiment (e.g., happy, sad, puzzled, disgust, or the like). The system and techniques may associate the sentiment with a timestamp and send the data (e.g., sentiment and associated timestamp) to a server. The server may receive such data from multiple (e.g., hundreds of thousands of) computing devices and analyze the data to determine a particular sentiment associated with each particular portion of the media content. In this way, each scene in the media content may have an associated sentiment (e.g., average sentiment) based on data received from multiple users.

In some cases, the computing device may, substantially in real-time (e.g., less than one second after determining the user's micro-expression), modify the playback of the media content based on a micro-expression of one or more users. For example, if one or more users have a particular type of micro-expression (e.g., disgust), then the computing device may skip a current portion (e.g., scene) of the media content that is being played back and advance playback of the media content to a next portion (e.g., next scene) of the media content.

Thus, when one or more users are viewing media content, a camera may capture micro-expressions associated with the users and associate a time stamp with each micro-expression. The micro-expressions may be associated with a particular portion of the media content, such as a scene in a movie or a show or an episode in an audio-playback or a news broadcast. The micro-expressions may be summarized in the form of a sentiment (e.g., happy, sad, disgust, confused, and the like) and sent to a server. Multiple data from multiple cameras may be sent to the server to enable the server to create a crowd-based sentiment map in which individual portions of the media content may have an associated sentiment.

In addition, the computing device may modify playback of the media content substantially in real-time based on the user's micro-expression (or sentiment). For example, if the micro-expression indicates disgust or surprise (e.g., a child walked into the room during an adult-oriented scene), the computing device may skip playback of a current portion (e.g., scene or chapter) and advance playback of the media content to a next portion (e.g., a next scene or a next chapter).

Thus, a computing device, such as a media playback device or a media streaming device may send media content to a display device (e.g., a television or a display monitor). A camera may be connected to (e.g., attached to or integrated with) the display device. The computing device may receive images from the camera and analyze (e.g., using machine learning) the images to determine a micro-expression of one or more users present in the images (e.g., in a field of view of the camera). The machine learning may determine a sentiment associated with the portion of the media content that is being played back, determine a timestamp (e.g., each of the images may include a timestamp) associated with the images (e.g., a timestamp of the first image), associate the sentiment with the timestamp and send the sentiment and timestamp to a server. In this way, the server may store a sentiment map of the media content. The sentiment map may identify, based on the timestamp, a portion (e.g., a scene or a chapter) of the media content and a sentiment associated with the portion.

During playback of the media content, if the sentiment associated with a current portion of the media content that is being played back matches a pre-specified sentiment (e.g., one or more of fear, disgust, anger, or contempt), then playback of a remainder of the current portion of the media content may be skipped and playback of a next portion of the media content may be initiated. Otherwise, e.g., if the sentiment associated with a current portion of the media content that is being played back does not match a pre-specified sentiment, then playback of the current portion of the media content may continue. In this way, the computing device may skip zero or more portions of the media content that the user does not enjoy viewing.

As an example, a computing device may include one or more processors and one or more non-transitory computer-readable storage media to store instructions executable by the one or more processors to perform various operation. For example, the operations may include initiating playback of media content on a display device that is connected to the computing device. The computing device may be a set-top box device, a media streaming device, or a combination of both. The operations may include receiving one or more images from a camera connected to the computing device. The camera may have a field of view that includes one or more viewers viewing the display device. The operations may include performing an analysis of at least one image of the one or more images and determining, based on the analysis, that the at least one image includes a micro-expression being expressed by at least one viewer of the one or more viewers. The operations may include determining a sentiment corresponding to the micro-expression. The operations may include determining a timestamp associated with the at least one image and associating the sentiment with the timestamp. The operations may include sending the sentiment and the timestamp to a server. The operations may include determining that the sentiment comprises a pre-specified sentiment, automatically skipping playback of a remainder of a current portion of the media content that is being played back on the display device, and automatically initiating playback of a next portion of the media content. For example, the current portion may include a particular chapter of a movie and the next portion may include a next chapter of the movie. As another example, the current portion may include a particular scene of a show and the next portion may include a next scene of the show. After playback of the media content has completed, the computing, the server, or both may create a sentiment map associated with the media content. The sentiment map includes a particular sentiment associated with individual portions of a plurality of portions of the media content. The sentiment may be one of: a neutral sentiment, a surprise sentiment, a fear sentiment, a disgust sentiment, an angry sentiment, a happy sentiment, a sad sentiment, or a contempt sentiment.

As a second example, a computing device may include one or more processors and one or more non-transitory computer-readable storage media to store instructions executable by the one or more processors to perform various operations. For example, the operations may include initiating playback of media content on a display device that is connected to the computing device. The computing device may be a set-top box device, a media streaming device, or a combination of both. The operations may include receiving one or more images from a camera connected to the computing device. The camera may have a field of view that includes one or more viewers viewing the display device. The operations may include performing an analysis of at least one image of the one or more images and determining that the at least one image includes a particular micro-expression being expressed by the one or more viewers. The operations may include determining a sentiment corresponding to the micro-expression. The operations may include determining a timestamp associated with the at least one image, associating the sentiment with the timestamp, and sending the sentiment and the timestamp to a server. The operations may include determining that the sentiment is one of a pre-specified set (of one or more) sentiments. In response, the computing device may automatically skip playback of a remainder of a current portion of the media content and automatically initiate playback of a next portion of the media content. For example, the current portion may include a particular chapter of a movie and the next portion may include a next chapter of the movie. As another example, the current portion may include a particular scene of a show and the next portion may include a next scene of the show. The pre-specified sentiment may include at least one of: a surprise sentiment, a fear sentiment, a disgust sentiment, an angry sentiment, or a contempt sentiment. After the computing device has completed playback of the media content, the server, the computing device, or both may create a sentiment map in which a particular sentiment is associated with an individual portion of a plurality of portions of the media content.

Figure 1:
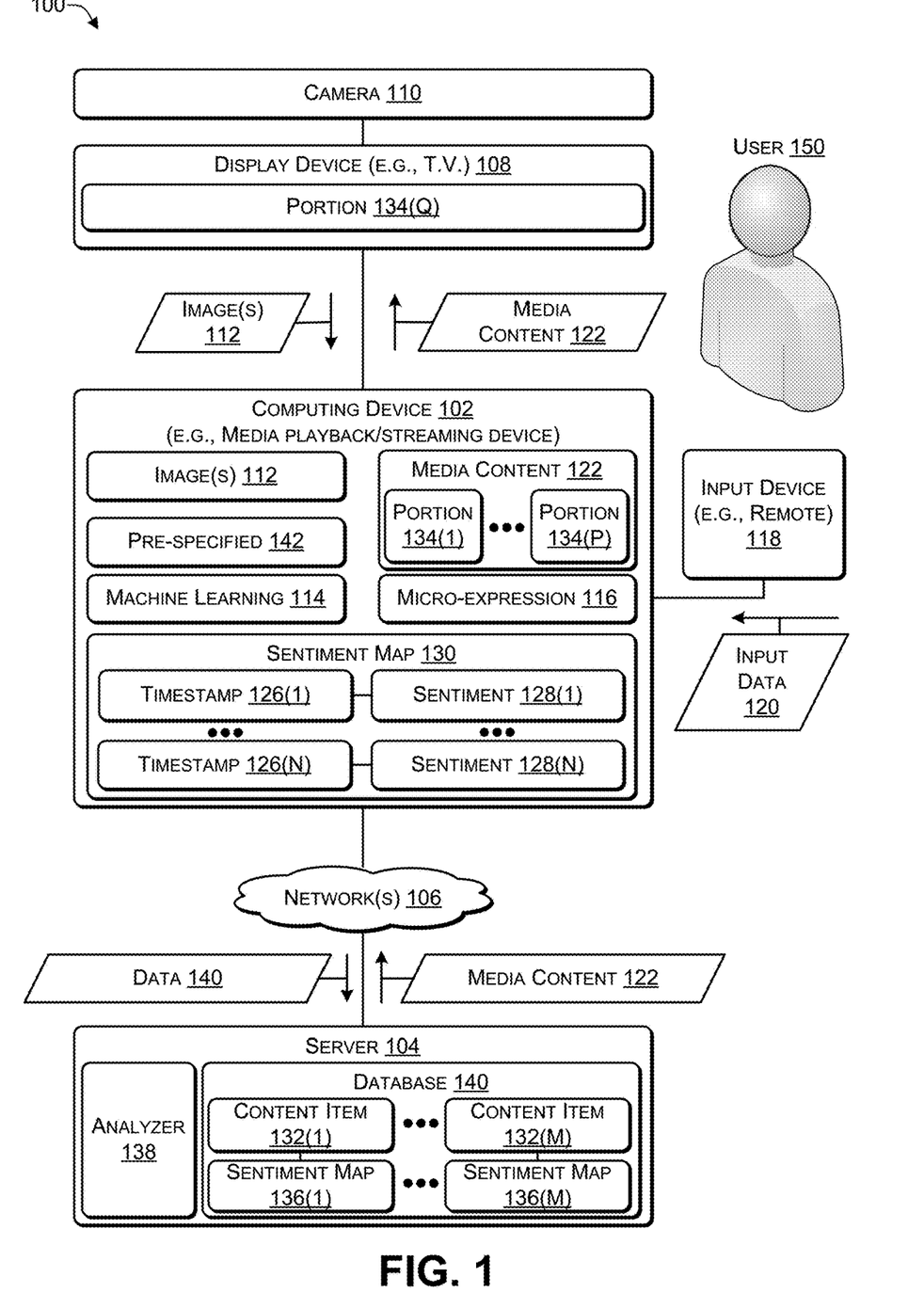
FIG. 1 is a block diagram of a system that includes a computing device to determine a sentiment associated with an event, according to some embodiments.

FIG. 1 is a block diagram of a system 100 that includes a computing device to determine a sentiment associated with an event, according to some embodiments. The system 100 may include a computing device (e.g., an information handling system) connected to a server 106 via a network 106. The computing device 102 may be a media playback device, such as a set top box device, streaming media device, or the like that is capable of sending media content 122 to a display device 108 that is connected to the computing device 102. A camera 110 may be connected to or integrated into the display device 110. The camera 110 may capture and send one or more images 112 (e.g., video frames) at a predetermined interval (e.g., 1, 15, 30, or 60 frames per second (fps)), to the computing device 102.

The network 106 may include multiple networks using multiple technologies, such as wired and wireless technologies. For example, a media content distribution company may make media content available to a home via a cable connection, a fiber connection, a satellite connection, an internet connection, or the like.

The computing device 102 may receive the one or more images 112 at a predetermined time interval from the camera 110. The one or more images 112 may include a micro-expression 116 of a user 150 when viewing a portion 134(Q) (e.g., a set of video frames, such as a scene) of the media content 122 (e.g., a movie, a show such as a comedy show, an audio-playback, a news broadcast or the like). The media content 122 may include multiple portions 134(1) to 134(P), where Q<=P and P>1. For illustration purposes, the examples discussed herein assume Q<P, where Q is a current portion of the media content 122. The computing device 102 may use machine learning 114 to identify a sentiment based on the micro-expression 116, determine a timestamp of a first image of the images 112, and associate the sentiment with the timestamp. In this way, after playing back the media content 122, the computing device 102 may have created a sentiment map 130. For example, the media content 122 has multiple portions 134 (e.g., scenes), and a timestamp 126 (e.g., a time when the portion starts) may be associated with a sentiment 128 that is determined based on the micro-expression of the user during each of the portions 134 of the media content 122. For example, for the media content 122, a timestamp 126(1) may have an associated sentiment 128(1) and a timestamp 126(N) may have an associated sentiment 128(N). To illustrate, a typical movie may have between about 40 to about 60 scenes (portions 134), a one-hour show may have about 20 to about 30 scenes (portions 134), and a half hour show may have about 10 to about 15 scenes (portions 134). The user 150 may use an input device 118, such as a remote control, to provide input data 120 to the computing device 102.

Each of the sentiments 128 may express one of multiple micro-expressions, such as one of neutral, surprise, fear, disgust, anger, happiness, sadness, and contempt. The neutral micro-expression may include eyes and eyebrows neutral and the mouth opened or closed with few wrinkles. The surprise micro-expression may include raised eyebrows, stretched skin below the brow, horizontal wrinkles across the forehead, open eyelids, whites of the eye (both above and below the eye) showing, jaw open and teeth parted, or any combination thereof. The fear micro-expression may include one or more eyebrows that are raised and drawn together (often in a flat line), wrinkles in the forehead between (but not across) the eyebrows, raised upper eyelid, tense (e.g., drawn up) lower eyelid, upper (but not lower) whites of eyes showing, mouth open, lips slightly tensed or stretched and drawn back, or any combination thereof. The disgust micro-expression may include a raised upper eyelid, raised lower lip, wrinkled nose, raised cheeks, lines below the lower eyelid, or any combination thereof. The anger micro-expression may include eyebrows that are lowered and drawn together, vertical lines between the eyebrows, tense lower eyelid(s), eyes staring or bulging, lips pressed firmly together (with corners down or in a square shape), nostrils flared (e.g., dilated), lower jaw jutting out, or any combination thereof. The happiness micro-expression may include the corners of the lips drawn back and up, the mouth may be parted with teeth exposed, a wrinkle may run from the outer nose to the outer lip, cheeks may be raised, lower eyelid may show wrinkles, Crow's feet near the eyes, or any combination thereof. The sadness micro-expression may include the inner corners of the eyebrows drawn in and up, triangulated skin below the eyebrows, one or both corners of the lips drawn down, jaw up, lower lip pouts out, or any combination thereof. The contempt (e.g., hate) micro-expression may include one side of the mouth raised.

After the computing device 102 determines a particular sentiment associated with a particular portion 134 of the media content 122, the computing device 102 may send data 140 to the server 104. The data 140 may include a current one of the timestamps 126 and the associated one of the sentiments 128. In this way, after the computing device 102 has completed playback of the media content 122, the server 104 may have a sentiment map 130 associated with the media content 122. For example, the server 104 may use a database 140 to store multiple media content items 132(1) to 132(M) (M>0) and associated sentiment maps 136(1) to 136(M), respectively. In some cases, an analyzer 138 may analyze the sentiment maps 136 to identify the types of sentiments that are popular. For example, the media content provider may determine that particular locations (e.g., zip codes) predominantly view horror movies (e.g., that case micro-expressions associated with the sentiment of fear) and the like. In this way, the media content provider may customize commercials or other advertisements based on the type of content being viewed in each location.

The user 150 may use the input device 118 to instruct the computing device 102 to initiate playback of the media content 122 on the display device 108, causing the display device 108 to display the portion 134(Q) of the media content 122. The computing device 102 may determine that the camera 110 is available and use the camera 110 to capture the images 112 when the user 150 is viewing the portion 134(Q) of the media content 122. The computing device 102 may receive the images 112 and use the machine learning 114 to identify the micro-expression 116 and the corresponding one of the sentiments 128 associated with the portion 134(Q). The computing device 102 may associate a timestamp with the sentiment. The computing device 102 may send the timestamp 126 and the associated sentiment 128 to the server 104.

If the computing device 102 determines that a current one of the sentiments 128 associated with the portion 134(Q) is a pre-specified sentiment 142, then the computing device 102 may skip playback of a remainder of the current portion 134(Q) of the media content 122 and initiate playback of a next portion 134 of the media content 122. For example, if the pre-specified sentiment 142 is disgust, then if the computing device 102 determines that the micro-expression 116 expresses the sentiment disgust, then the computing device 102 may skip playback of the current portion 134(Q) of the media content 122 and initiate playback of a next portion of the media content 122. To illustrate, when the user 150 is viewing adult content and a child walks into the room, the user 150, the child, or both may have the micro-expression 116 that expresses the sentiment of disgust. In response to detecting the sentiment of disgust in the micro-expression 116 of the images 112, the computing device 102 may automatically skip playback of the current portion 134(Q) of the media content 122 and initiate playback of a next portion of the media content 122.

In other cases, a different sentiment besides disgust may be the pre-specified sentiment 142 to cause automatic skipping of a portion of the media content 122. For example, depending on the implementation, determining one or more of surprise, fear, anger, or contempt in the micro-expression 116 may be used to cause the computing device 102 to skip playback of the current portion 134(Q) of the media content 122 and initiate playback of a next one of the portions 134 of the media content 122.

In some cases, the machine learning 114 may learn which portions of media content to skip based on the behavior of the user 150. For example, the user 150 may be uncomfortable viewing certain types of scenes (e.g., graphic sexual scene, masochism, nudity, or the like) and use the input device 118 to instruct the computing device 102 to skip to a next one of the portions 134 (e.g., a next chapter marker in a video). The user 150 may exhibit one or more particular micro-expressions corresponding to one or more particular sentiments when the user 150 is uncomfortable viewing certain types of scenes. The machine learning 114 may correlate the input data 120 (e.g., instructing, using the input device 118, the computing device 102 to skip to a next scene or chapter) with a current sentiment (one of the sentiments 128) and perform machine learning. In this way, the machine learning 114 may, in response to determining a particular micro-expression in the images 112 associated with the portion 134(Q), determine that the user 150 is uncomfortable (e.g., one or more of disgust, contempt, surprise, fear, or anger), and automatically (e.g., without human interaction) skip the current portion 134(Q) of the media content 122 and initiate playback of a next one of the portions 134 of the media content 122. Of course, this may apply to all users whose face is within a field of view of the camera 110. For example, the user 150 may be viewing adult media content and another person (e.g., a spouse, a child, one of the user's parents, one of the user's grandparents, or the like) may walk in to the room. If the camera 110 captures the images 112 that include the other person and the other person's micro-expression 116 expresses one or more of the pre-specified sentiments 142 (e.g., one or more of disgust, contempt, surprise, fear, anger, or contempt), then the computing device 102 may automatically (e.g., without the user 150 doing anything) skip the current portion 134(Q) and initiate playback of a next one of the portions 134 (e.g., next chapter) of the media content 122.

The machine learning 114 may learn what types of scenes the user 150 is interested in viewing and which types of scenes the user 150 is uninterested in viewing. For example, a car enthusiast may enjoy watching scenes that include car chases. The computing device 102 may learn this by determining that the user 150 uses the input device 118 to skip scenes that don't include car chases. After the machine learning 114 has learned this behavior, the machine learning 114 may automatically skip playback of the portion 134(Q) and skip to a next one of the portions 134 of the media content 122 when the micro-expression 116 indicates particular sentiments (e.g., one or more of neutral, disgust, anger, or contempt) that indicate that the user is not interested in viewing the current portion 134(Q).

Thus, a computing device, such as a media playback device or a media streaming device may send media content to a display device (e.g., an audio player, a television or a display monitor). A camera may be connected to (e.g., attached to or integrated with) the display device. The computing device may receive images from the camera and analyze (e.g., using machine learning) the images to determine a micro-expression of one or more users present in the images (e.g., in a field of view of the camera). The machine learning may determine a sentiment associated with the portion of the media content that is being played back, determine a timestamp (e.g., each of the images may include a timestamp) associated with the images (e.g., a timestamp of the first image), associate the sentiment with the timestamp and send the sentiment and timestamp to a server. In this way, the server may store a sentiment map of the media content. The sentiment map may identify, based on the timestamp, a portion (e.g., a scene or a chapter) of the media content and a sentiment associated with the portion.

During playback of the media content, if the sentiment associated with a current portion of the media content that is being played back matches a pre-specified sentiment (e.g., one or more of fear, disgust, anger, or contempt), then playback of a remainder of the current portion of the media content may be skipped and playback of a next portion of the media content may be initiated. Otherwise, e.g., if the sentiment associated with a current portion of the media content that is being played back does not match a pre-specified sentiment, then playback of the current portion of the media content may continue. In this way, the computing device may skip zero or more portions of the media content that the user does not enjoy viewing, thereby providing a more enjoyable media content viewing experience.

Figure 2:
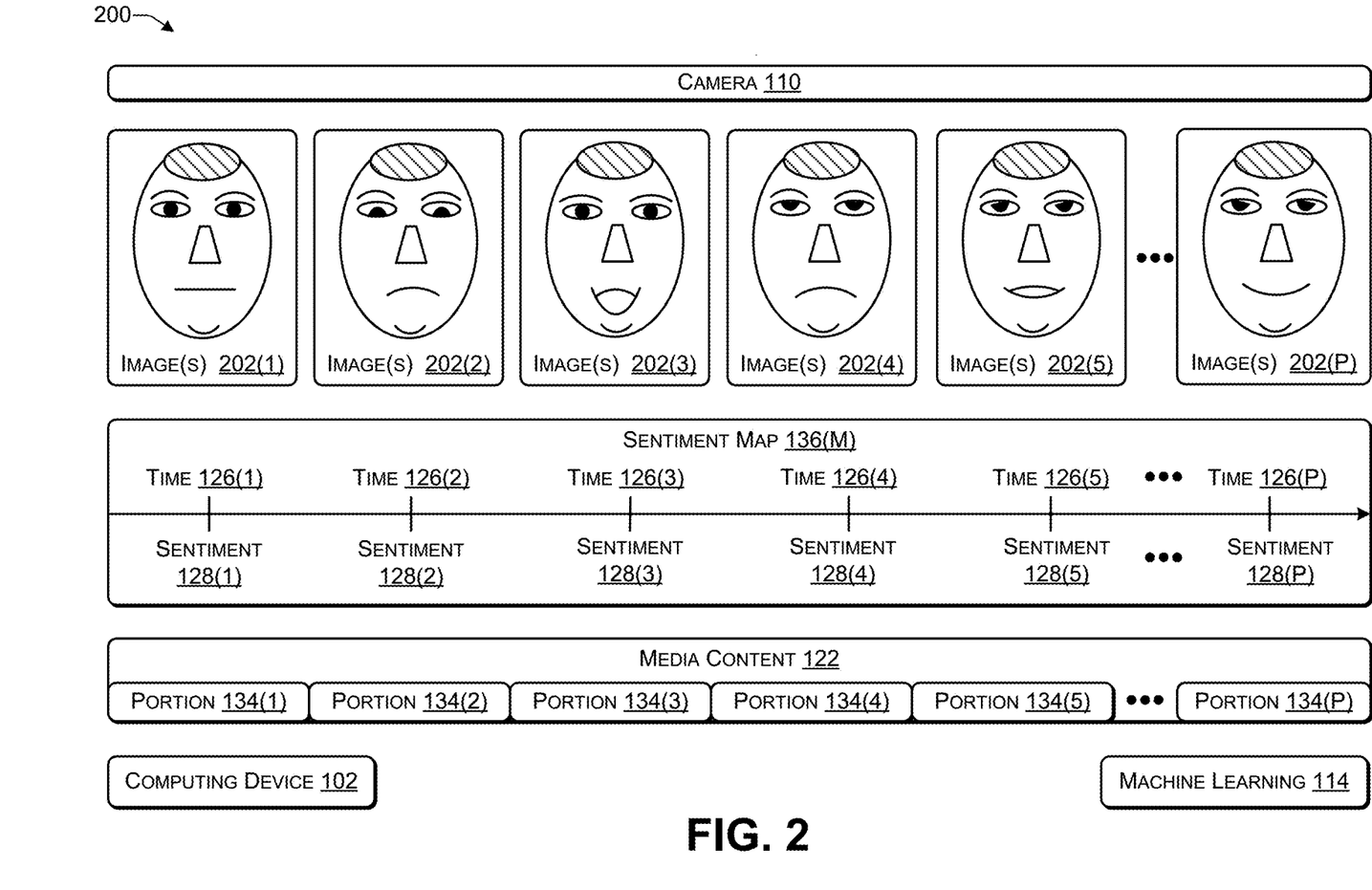
FIG. 2 is a block diagram illustrating a sentiment map, according to some embodiments.

FIG. 2 is a block diagram 200 illustrating a sentiment map, according to some embodiments.

The machine learning 114 may analyze one or more images 202(1) (e.g., the images 112 of FIG. 1) from the camera 110 and determine a sentiment 126(1) (e.g., neutral). The machine learning 114 may associate the timestamp 126(1) from the images 202(1) to indicate when the user displayed the sentiment 126(1). In this way, the sentiment map 136(M) indicates that when the portion 134(1) is being played back, the user 150 displays the sentiment 128(1) at the time 124(1).

The machine learning 114 may analyze one or more images 202(2) (e.g., the images 112 of FIG. 1) from the camera 110 and determine a sentiment 126(2) (e.g., contempt or disgust). The machine learning 114 may associate the timestamp 126(2) from the images 202(2) to indicate when the user displayed the sentiment 126(2). In this way, the sentiment map 136(M) indicates that when the portion 134(2) is being played back, the user 150 displays the sentiment 128(2) at the time 124(2). Here, because the user 150 displays the sentiment of disgust or contempt, the machine learning 114 may automatically skip a remaining playback of the portion 134(2) and skip to the next portion 134(3).

The machine learning 114 may analyze one or more images 202(3) (e.g., the images 112 of FIG. 1) from the camera 110 and determine a sentiment 126(3) (e.g., happy). The machine learning 114 may associate the timestamp 126(3) from the images 202(3) to indicate when the user displayed the sentiment 126(3). In this way, the sentiment map 136(M) indicates that when the portion 134(3) is being played back, the user 150 displays the sentiment 128(3) at the time 124(3).

The machine learning 114 may analyze one or more images 202(4) (e.g., the images 112 of FIG. 1) from the camera 110 and determine a sentiment 126(4) (e.g., contempt or disgust). The machine learning 114 may associate the timestamp 126(4) from the images 202(4) to indicate when the user displayed the sentiment 126(4). In this way, the sentiment map 136(M) indicates that when the portion 134(4) is being played back, the user 150 displays the sentiment 128(4) at the time 124(4). Here, because the user 150 displays the sentiment of disgust or contempt, the machine learning 114 may automatically skip a remaining playback of the portion 134(4) and skip to the next portion 134(5).

The machine learning 114 may analyze one or more images 202(5) (e.g., the images 112 of FIG. 1) from the camera 110 and determine a sentiment 126(5) (e.g., neutral). The machine learning 114 may associate the timestamp 126(5) from the images 202(5) to indicate when the user displayed the sentiment 126(5). In this way, the sentiment map 136(M) indicates that when the portion 134(5) is being played back, the user 150 displays the sentiment 128(5) at the time 124(5).

The machine learning 114 may analyze one or more images 202(P) (e.g., the images 112 of FIG. 1) from the camera 110 and determine a sentiment 126(P) (e.g., happy). The machine learning 114 may associate the timestamp 126(P) from the images 202(P) to indicate when the user displayed the sentiment 126(P). In this way, the sentiment map 136(M) indicates that when the portion 134(P) is being played back, the user 150 displays the sentiment 128(P) at the time 124(P).

Thus, images may be analyzed to identify a sentiment of a user, at what time the user displayed the sentiment, which portion of the media content the user was viewing, and the like. If the user displays one or more pre-specified (or learned) sentiments, then the machine learning 114 may automatically skip playback of a remainder of the current portion and initiate playback of a next portion of the media content.

Figure 3:
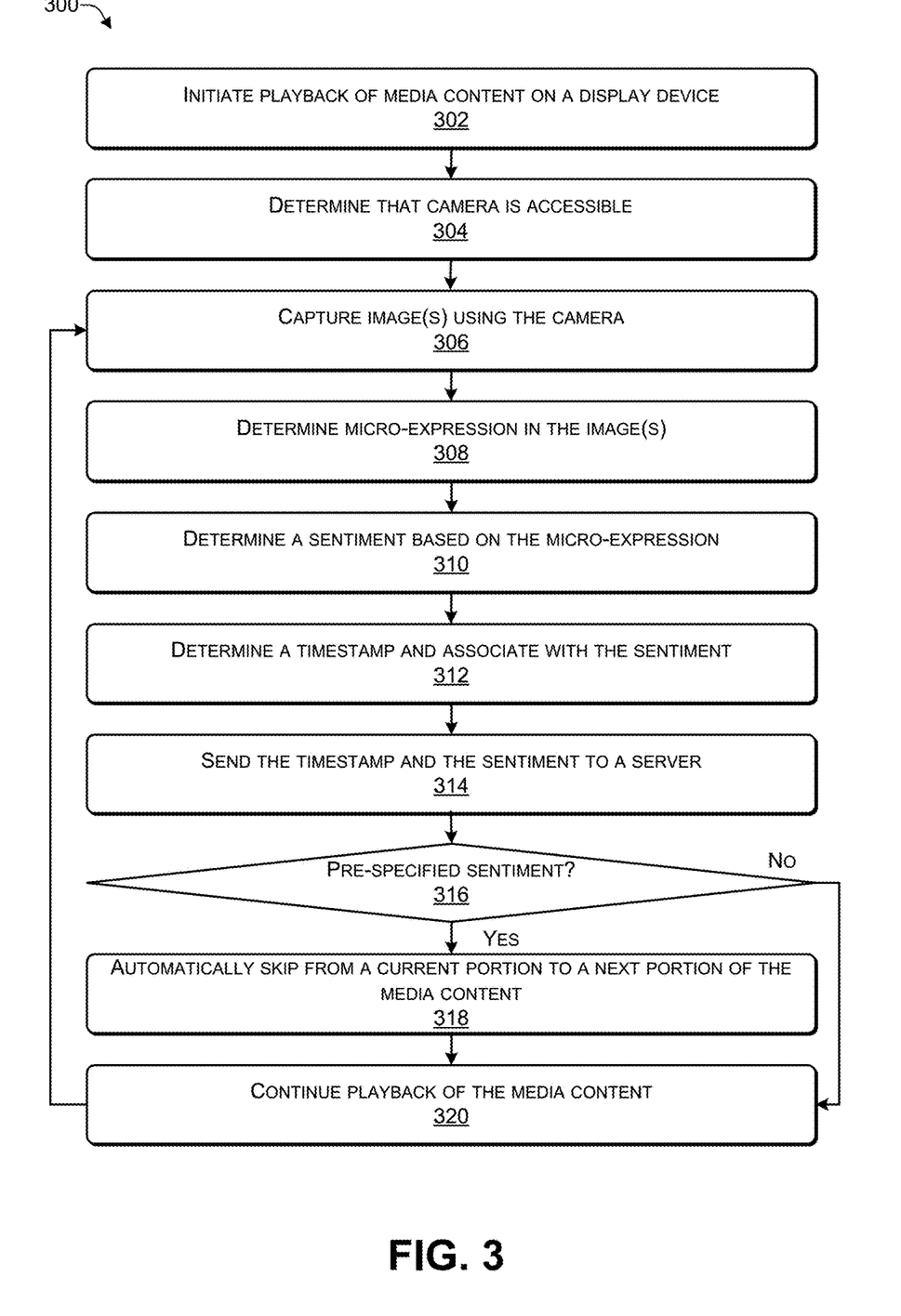
FIG. 3 is a flowchart of a process that associates associating sending a timestamp and a sentiment associated with a portion of media content, according to some embodiments.

In the flow diagram of FIG. 3, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 300 is described with reference to FIGS. 1 and 2 as described above, although other models, frameworks, systems and environments may be used to implement this process.

FIG. 3 is a flowchart of a process 300 that associates associating sending a timestamp and a sentiment associated with a portion of media content, according to some embodiments. The process may be performed by the computing device 102 of FIGS. 1 and 2.

At 302, the process may initiate playback of media content on a display device. At 304, the process may determine that a camera is accessible. At 306, the process may capture one or more images using the camera. For example, in FIG. 1, the user 150 may use the input device 118 to instruct the computing device 102 to initiate playback of the media content 122 on the display device 108, causing the display device 108 to display the portion 134(Q) of the media content 122. The computing device 102 may determine that the camera 110 is available and use the camera 110 to capture the images 112 when the user 150 is viewing the portion 134(Q) of the media content 122.

At 308, the process may determine a micro-expression expressed in the one or more images. At 310, the process may determine a sentiment based on the micro-expression. For example, in FIG. 1, the computing device 102 may receive the images 112 and use the machine learning 114 to identify the micro-expression 116 and the corresponding one of the sentiments 128 associated with the portion 134(Q). The computing device 102 may associate a timestamp with the sentiment. The computing device 102 may send the timestamp 126 and the associated sentiment 128 to the server 104.

At 312, the process may determine a timestamp and associate the timestamp with the sentiment. At 314, the process may send the timestamp and the sentiment to a server. For example, in FIG. 1, the computing device 102 may associate a timestamp with the sentiment. The computing device 102 may send the timestamp 126 and the associated sentiment 128 to the server 104.

At 316, the process may determine whether the sentiment is one of a pre-specified sentiment. If the process determines, at 316, that "yes" the sentiment is one of the pre-specified sentiments, then the process may proceed to 318, where a current portion of the media content may be skipped and play back of a next portion of the media content may be initiated. If the process determines, at 316, that "no" the sentiment is not one of the pre-specified sentiments, then the process may proceed to 320. At 320, the process may continue playback of the media content and the process may proceed to 306 to capture additional images using the camera. For example, in FIG. 1, if the computing device 102 determines that a current one of the sentiments 128 associated with the portion 134(Q) is a pre-specified sentiment 142, then the computing device 102 may skip playback of a remainder of the current portion 134(Q) of the media content 122 and initiate playback of a next portion 134 of the media content 122. For example, if the pre-specified sentiment 142 is disgust, then if the computing device 102 determines that the micro-expression 116 expresses the sentiment disgust, then the computing device 102 may skip playback of the current portion 134(Q) of the media content 122 and initiate playback of a next portion of the media content 122. If the computing device 102 determines that a current one of the sentiments 128 associated with the portion 134(Q) is not one of the pre-specified sentiments 142, then the computing device 102 may continue playback of the current portion 134(Q) of the media content 122.

Thus, a computing device, such as a media playback device or a media streaming device may send media content to a display device (e.g., a television or a display monitor). A camera may be connected to (e.g., attached to or integrated with) the display device. The computing device may receive images from the camera and analyze (e.g., using machine learning) the images to determine a micro-expression of one or more users present in the images (e.g., in a field of view of the camera). The machine learning may determine a sentiment associated with the portion of the media content that is being played back, determine a timestamp (e.g., each of the images may include a timestamp) associated with the images (e.g., a timestamp of the first image), associate the sentiment with the timestamp and send the sentiment and timestamp to a server. In this way, the server may store a sentiment map of the media content. The sentiment map may identify, based on the timestamp, a portion (e.g., a scene or a chapter) of the media content and a sentiment associated with the portion.

During playback of the media content, if the sentiment associated with a current portion of the media content that is being played back matches a pre-specified sentiment (e.g., one or more of fear, disgust, anger, or contempt), then playback of a remainder of the current portion of the media content may be skipped and playback of a next portion of the media content may be initiated. Otherwise, e.g., if the sentiment associated with a current portion of the media content that is being played back does not match a pre-specified sentiment, then playback of the current portion of the media content may continue. In this way, the computing device may skip zero or more portions of the media content that the user does not enjoy viewing.

In this way, portions of the media content that the user(s) feel uncomfortable viewing may be automatically skipped to improve the user(s) experience when viewing media content.

Figure 4:
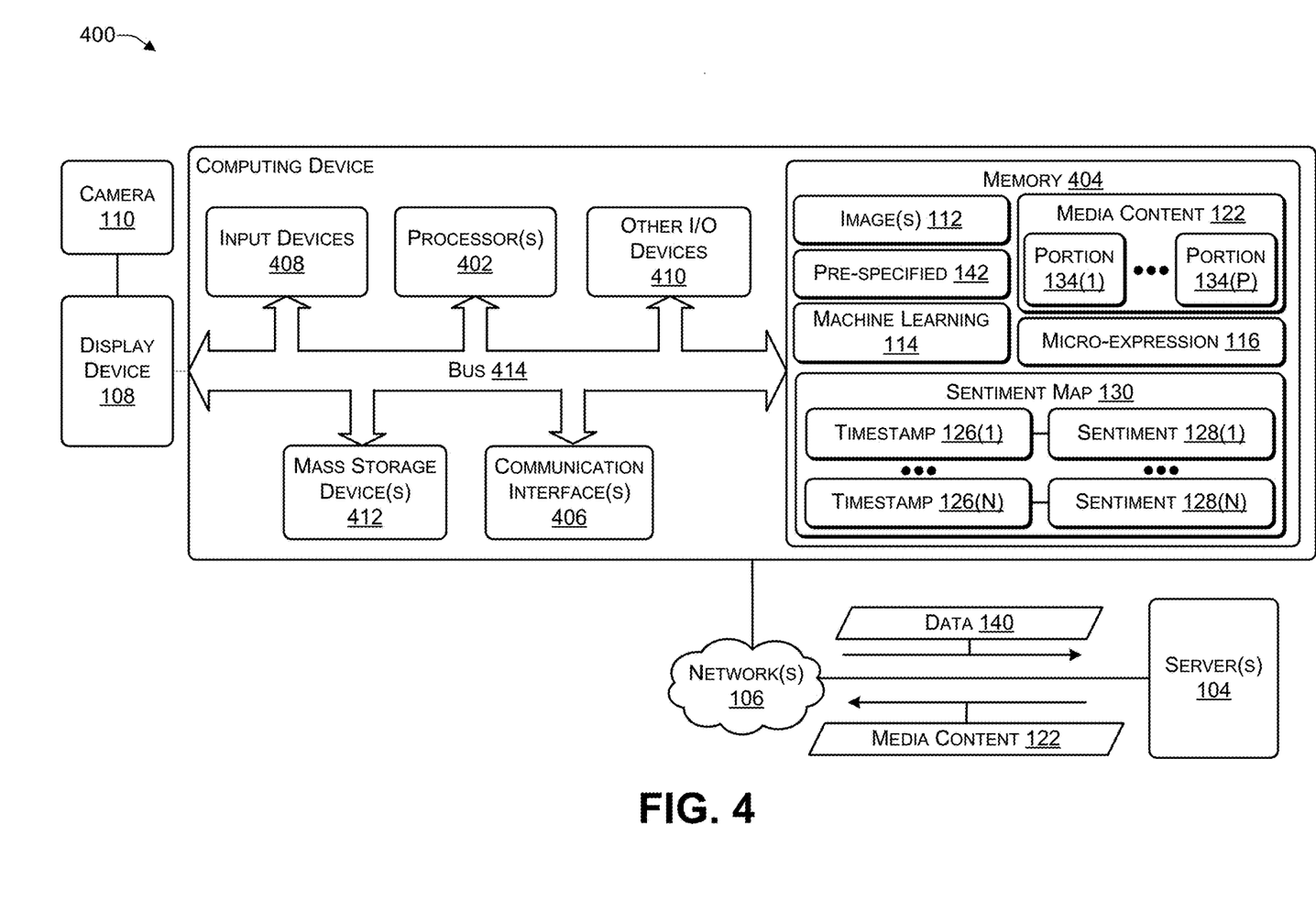
FIG. 4 illustrates an example configuration of a computing device that can be used to implement the systems and techniques described herein.

FIG. 4 illustrates an example configuration of a computing device 400 that can be used to implement the computing device 102 or the server 104 of FIGS. 1 and 2. For illustration purposes, in FIG. 4, the computing device 400 is shown implementing the computing device 102 of FIGS. 1 and 2.

The computing device 102 may include one or more processors 402 (e.g., CPU, GPU, or the like), a memory 404, communication interfaces 406, a display device 408, input devices 408 (e.g., the input device 118 of FIG. 1), other input/output (I/O) devices 410 (e.g., trackball and the like), and one or more mass storage devices 412 (e.g., disk drive, solid state disk drive, or the like), configured to communicate with each other, such as via one or more system buses 414 or other suitable connections. While a single system bus 414 is illustrated for ease of understanding, it should be understood that the system buses 414 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 402 are one or more hardware devices that may include a single processing unit or a number of processing units, all of which may include single or multiple computing units or multiple cores. The processors 402 may include a graphics processing unit (GPU) that is integrated into the CPU or the GPU may be a separate processor device from the CPU. The processors 402 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 402 may be configured to fetch and execute computer-readable instructions stored in the memory 404, mass storage devices 412, or other computer-readable media.

Memory 404 and mass storage devices 412 are examples of computer storage media (e.g., memory storage devices) for storing instructions that can be executed by the processors 402 to perform the various functions described herein. For example, memory 404 may include both volatile memory and non-volatile memory (e.g., RAM, ROM, or the like) devices. Further, mass storage devices 412 may include hard disk drives, solid-state drives, removable media, including external and removable drives, memory cards, flash memory, floppy disks, optical disks (e.g., CD, DVD), a storage array, a network attached storage, a storage area network, or the like. Both memory 404 and mass storage devices 412 may be collectively referred to as memory or computer storage media herein and may be any type of non-transitory media capable of storing computer-readable, processor-executable program instructions as computer program code that can be executed by the processors 402 as a particular machine configured for carrying out the operations and functions described in the implementations herein.

The computing device 400 may include one or more communication interfaces 406 for exchanging data via the network 106 (e.g., when the computing device 400 is connected to the dock 104). The communication interfaces 406 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 406 can also provide communication with external storage, such as a storage array, network attached storage, storage area network, cloud storage, or the like.

The display device 408 may be used for displaying content (e.g., information and images) to users. Other I/O devices 410 may be devices that receive various inputs from a user and provide various outputs to the user, and may include a keyboard, a touchpad, a mouse, a printer, audio input/output devices, and so forth. The computer storage media, such as memory 116 and mass storage devices 412, may be used to store software and data, such as, for example, the images 112, the micro-expression 116, the machine learning 114, the media content 122, the sentiment map 130, and the like.

Thus, the computing device 400, may be a media playback device or a media streaming device. The computing device 400 may send media content 122 to the display device 108 (e.g., a television or a display monitor). The camera 110 may be connected to (e.g., attached to or integrated with) the display device 108. The computing device 400 may receive the images 112 from the camera and analyze (e.g., using machine learning 114) the images 112 to determine the micro-expression 116 of one or more users present in the images 112 (e.g., in a field of view of the camera 110). The machine learning 114 may determine a sentiment (e.g., one of the sentiments 128) associated with the portion of the media content 122 that is being played back on the display device 108, determine a timestamp (e.g., each of the images 112 may include a timestamp) associated with the images 112 (e.g., a timestamp of the first image), associate the sentiment 128 with the timestamp 126 and send the data 140 that includes the sentiment 128 and the timestamp 126 to the server 104. In this way, the server 104 may store a sentiment map 130 of the media content 122. The sentiment map 130 may identify, based on the timestamp 126, a portion (e.g., a scene or a chapter) of the media content 122 and a sentiment 128 associated with the portion 134.

During playback of the media content 122, if the sentiment 134 associated with a current portion of the media content 122 that is being played back matches a pre-specified sentiment 142 (e.g., one or more of fear, disgust, anger, or contempt), then playback of a remainder of the current portion of the media content 122 may be skipped and playback of a next portion of the media content 122 may be initiated. Otherwise, e.g., if the sentiment associated with a current portion of the media content 122 that is being played back on the display device 108 does not match the pre-specified sentiment 142, then playback of the current portion of the media content 122 may continue. In this way, the computing device 400 may automatically skip portions of the media content 122 that the user does not enjoy viewing (according to the user's micro-expressions).

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement pre-scribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    initiating, by one or more processors of a computing device, sequential playback of a plurality of portions of media content on a display device that is connected to the computing device;
    after the sequential playback initiation, initiating, by the one or more processors, playback of a portion of the plurality of portions on the display device;
    receiving, by the one or more processors, one or more images from a camera connected to the computing device, the camera having a field of view that includes one or more viewers viewing the display device, wherein the one or more images of the one or more viewers are captured by the camera as the portion is played back on the display, and received as the portion is played back on the display;
    performing an analysis, by the one or more processors, of at least one image of the one or more images;
    determining, by the one or more processors and based on the analysis, that the at least one image includes a micro-expression being expressed by the one or more viewers;
    determining, by the one or more processors, a sentiment corresponding to the micro-expression;
    automatically skipping playback of a remainder of the portion that is being played back on the display device based on the micro-expression expressed by the one or more viewers captured by the camera as the portion is played back on the display, and received as the portion is played back on the display;
    determining, by the one or more processors, a timestamp associated with the at least one image, wherein the timestamp is defined as a time interval between a time when the sequential playback of the plurality of portions was initiated and a time when the playback of the portion was initiated, or the timestamp is defined as a time interval between the time when the sequential playback of the plurality of portions was initiated and a time when the one or more images are received from the camera;
    associating, by the one or more processors, the sentiment with the timestamp; and
    sending, by the one or more processors, the sentiment and the timestamp to a server;
    the server creating a sentiment map;
    the server identifying the portion based on the timestamp it receives;
    wherein the server updates the sentiment map by mapping the sentiment it receives to the identified portion.

2. The method of claim 1, further comprising:
    determining that the sentiment comprises a pre-specified sentiment;
    automatically skipping playback of a remainder of the portion that is being played back on the display device; and
    automatically initiating playback of another portion of the plurality of portions, wherein the other portion is linked with another sentiment that is different from the sentiment.

3. The method of claim 2, wherein:
    the portion comprises a particular chapter of a movie; and
    the next portion comprises a next chapter of the movie.

4. The method of claim 2, wherein:
the portion comprises a particular scene of a show; and
the other portion comprises a another scene of the show.

5. The method of claim 1:
wherein the sentiment map includes distinct sentiments mapped to one portion of the plurality of portions.

6. The method of claim 1:
wherein the sentiment map includes distinct sentiments mapped to respective portions of the plurality of portions.

7. The method of claim 1, wherein the sentiment comprises one of:
a neutral sentiment, a surprise sentiment, a fear sentiment, a disgust sentiment, an angry sentiment, a happy sentiment, a sad sentiment, or a contempt sentiment.

8. A computing device comprising:
a display device for displaying a plurality of portions of media content;
one or more processors; and
one or more non-transitory computer-readable storage media to store instructions executable by the one or more processors to perform operations comprising:
initiating sequential playback of a plurality of portions of media content on the display device;
after the sequential playback initiation, initiating playback of a portion of the plurality of portions on the display device;
receiving one or more images from a camera connected to the computing device, the camera having a field of view that includes one or more viewers viewing the display device as the display device is displaying the portion, wherein the one or more images of the one or more viewers are captured by the camera as the portion is played back on the display, and received as the portion is played back on the display;
performing an analysis of at least one image of the one or more images;
determining that the at least one image includes a particular micro-expression being expressed by the one or more viewers;
determining a sentiment corresponding to the micro-expression;
automatically skipping playback of a remainder of the portion that is being played back on the display device based on the micro-expression expressed by the one or more viewers captured by the camera as the portion is played back on the display, and received as the portion is played back on the display;
determining a timestamp associated with the at least one image, wherein the timestamp is determined based on a time when the sequential playback was initiated;
mapping the sentiment with the timestamp in a sentiment map in memory of the computing device; and
sending the sentiment and the timestamp to a server.

9. The computing device of claim 8, wherein the operations further comprise:
determining that the sentiment comprises a pre-specified sentiment;
automatically skipping playback of a remainder of the portion of the media content; and
automatically initiating playback of another portion of the plurality of portions, wherein the other portion is linked with another sentiment that is different from the sentiment.

10. The computing device of claim 9, wherein:
the portion comprises a particular chapter of a movie; and
the other portion comprises a another chapter of the movie.

11. The computing device of claim 9, wherein:
the portion comprises a particular scene of a show; and
the other portion comprises a another scene of the show.

12. The computing device of claim 9, wherein the pre-specified sentiment comprises at least one of:
a surprise sentiment, a fear sentiment, a disgust sentiment, an angry sentiment, or a contempt sentiment.

13. The computing device of claim 8, wherein:
the computing device comprises one of a set-top box device or a media streaming device.

14. One or more non-transitory computer readable media storing instructions executable by an embedded controller to perform operations comprising:
initiating a sequential playback of a portion of a plurality of portions of media content on a display device;
after the sequential playback initiation, initiating playback of a portion of the plurality of portions on the display device;
receiving one or more images from a camera as the portion is displayed on the display device, the camera having a field of view that includes one or more viewers viewing the display device, wherein the one or more images of the one or more viewers are captured by the camera as the portion is played back on the display, and received as the portion is played back on the display;
performing an analysis of at least one image of the one or more images;
determining that the at least one image includes a particular micro-expression being expressed by the one or more viewers;
determining a sentiment corresponding to the micro-expression;
automatically skipping playback of a remainder of the portion that is being played back on the display device based on the micro-expression expressed by the one or more viewers captured by the camera as the portion is played back on the display, and received as the portion is played back on the display;
determining a timestamp associated with the at least one image, wherein the timestamp is defined as a time interval between a time when the sequential playback of the plurality of portions was initiated and a time when the playback of the portion was initiated, or the timestamp is defined as a time interval between the time when the sequential playback of the plurality of portions was initiated and a time when the one or more images are received from the camera;
mapping the sentiment with the timestamp in a sentiment map in memory;
sending the sentiment and the timestamp to a server.

15. The one or more non-transitory computer readable media of claim 14, wherein the operations further comprise:
determining that the sentiment comprises a pre-specified sentiment;
automatically skipping playback of a remainder of the portion of the media content; and
automatically initiating playback of a another portion of the media content.

16. The one or more non-transitory computer readable media of claim 15, wherein:
the portion comprises a particular chapter of a movie; and
the other portion comprises a next chapter of the movie.

17. The one or more non-transitory computer readable media of claim 15, wherein:
the portion comprises a particular scene of a show; and
the other portion comprises a next scene of the show.

18. The one or more non-transitory computer readable media of claim 14, wherein the sentiment comprises one of:
a neutral sentiment, a surprise sentiment, a fear sentiment, a disgust sentiment, an angry sentiment, a happy sentiment, a sad sentiment, or a contempt sentiment.

\* \* \* \* \*